United States Patent [19]
Maeda

[11] Patent Number: 5,641,042
[45] Date of Patent: Jun. 24, 1997

[54] ANOMALOUS BRAKING ELEMENT TEMPERATURE-RISE DETECTOR ASSEMBLY

[76] Inventor: Hiroyuki Maeda, 49-7-608, Naritahigashi 1-chome, Suginami-ku, Tokyo 166, Japan

[21] Appl. No.: 535,904

[22] Filed: Sep. 28, 1995

[30] Foreign Application Priority Data

Oct. 25, 1994 [JP] Japan .................................. 6-284237

[51] Int. Cl.$^6$ ...................................................... G01K 5/42
[52] U.S. Cl. .................................. 188/1.11; 374/159
[58] Field of Search ........................ 188/1.11; 192/30 W; 116/101, 102, 103, 208, DIG. 8; 374/159; 340/454

[56] References Cited

U.S. PATENT DOCUMENTS

| | | |
|---|---|---|
| 3,662,863 | 5/1972 | Dornback .................... 188/1.11 W |
| 3,855,865 | 12/1974 | Kishimoto et al. . |
| 3,975,706 | 8/1976 | Kato . |
| 3,992,944 | 11/1976 | Woodle . |

FOREIGN PATENT DOCUMENTS

59-80538   5/1984   Japan .

*Primary Examiner*—Douglas C. Butler
*Attorney, Agent, or Firm*—Flynn, Thiel, Boutell & Tanis, P.C.

[57] ABSTRACT

An anomalous braking element temperature-rise detector assembly detecting anomalous temperature rise of a braking element so as to prevent braking force from being lowered owing to occurrence of fade and also prevent the braking element from being inactive owing to occurrence of vapor-lock, which contributes to reliability and safety of a brake. The anomalous braking element temperature-rise detector includes a rotatable member and a temperature-rise member which is a part of a group of braking elements which act on the rotatable member so as to provide braking force thereagainst, the temperature-rise member rising in temperature when brake force is provided against the rotatable member. The anomalous braking element temperature-rise detector assembly further includes a hydrogen absorbing material for absorbing hydrogen at ordinary temperature and discharging hydrogen when the temperature-rise member rises to anomalous temperature. The anomalous braking element temperature-rise detector assembly also includes a stretchable body for accommodating therein the hydrogen absorbing material, the stretchable body being fixed to the temperature-rise member such that heat transfer occurs between the temperature-rise member and the hydrogen absorbing material, wherein a part of the stretchable body slidably contacts the rotatable member which rotates relative to the stretchable body in a state where the stretchable body is extended by hydrogen discharged from the hydrogen absorbing material.

7 Claims, 5 Drawing Sheets

ANOMALOUS BRAKING ELEMENT TEMPERATURE-RISE DETECTOR ASSEMBLY

BACKGROUND OF THE INVENTION

1. Field of the Invention

The present invention relates to a device for detecting anomalous rise of temperature of a brake

2. Prior Art

In a prior art braking element composed of a disc brake or a drum brake, a friction member is permitted to slidably contact a rotating member composed of a disc or drum which rotates together with a wheel so as to generate braking force. Accordingly, braking frictional heat is generated by braking operation. When the friction member rises in temperature owing to the braking frictional heat, the so-called fade occurs which reduces the braking force, and vapor-lock occurs in the worst case, which inactivates the braking operation.

Fade is a phenomenon where frictional coefficient is reduced so as to lower the braking force as the friction member made of an organic material rises in temperature. For example, in case of using phenolic resin as a binder, heat resistant characteristic of phenolic resin which is not denatured, namely, temperature at which the weight of the phenolic resin is sharply reduced in the atmosphere owing to thermal decomposition ranges from 300° to 350° C. Accordingly, offensive smell is generated at the temperature ranging from 300° to 350 ° C. Vapor-lock is a phenomenon where the brake fluid rises to an anomalous temperature whereby a part of the brake fluid is evaporated to be changed to gas, whereby fluid under pressure is not transmitted. Vapor-lock occurs generally in a state where the friction member rises to the temperature higher than the temperature at which fade occurs in the friction member and which influences upon the brake fluid. Meanwhile, boiling point of the brake fluid when the brake fluid absorbs moisture (wet boiling point) is about 140° C.

Whereupon, the prior art braking element is not provided with an anomalous braking element temperature-rise detector for generating a different (unusual) noise, namely, jar. Accordingly, it is impossible to detect that the friction member rises to an anomalous temperature owing to the braking frictional heat, whereby fade or vapor-lock occurs, which causes a problem to render the vehicle in a dangerous state. According the invention, a detector for slidably contacting the disc, when the friction member is worn out and reduced in thickness to the limit of use thereof, is fixed to a back plate of the pad.

SUMMARY OF THE INVENTION

The present invention has been made in view of the drawbacks of the prior art braking element.

To achieve the above object, the anomalous braking element temperature-rise detector comprises a stretchable body (21; 31; 41), a temperature-rise member (16; 55c) of a braking element to which the anomalous braking element temperature-rise detector (20) is fixed, hydrogen absorbing material (22) accommodated in the body (21; 31; 41) for absorbing hydrogen at ordinary temperature and discharging hydrogen when the temperature-rise member (16; 55c) rises to anomalous temperature owing to a braking frictional heat of the braking element, wherein the hydrogen absorbing material (22) in the stretchable body (21; 31; 41) is disposed to confront the temperature-rise member (16: 55c), and wherein a part of the stretchable body (21; 31; 41) slidably contacts a rotating member (1, 51) which rotates relative to the stretchable body (21; 31; 41) in a state where the stretchable body (21; 31; 41) is extended by hydrogen emitted from the hydrogen absorbing material (22).

An anomalous braking element temperature-rise detector according to a second aspect of the invention comprises the same structure as the first aspect of the invention wherein the stretchable body (21; 31; 41) is fixed to a back plate (16) of a pad (10) of a disc brake serving as the temperature-rise member (16), wherein a part of the stretchable body (21; 31; 41) slidably contacts a disc (1) serving as the rotating member (1) in a state where a friction member (17) of the pad (10) is worn out by a given amount.

According to the first aspect of the invention, the temperature-rise member (16, 55c) rises in temperature gradually owing to the braking frictional heat with repetition of the braking operation. When the temperature-rise member (16, 55c) rises to a given anomalous temperature, hydrogen is emitted from the hydrogen absorbing material 22 so that the stretchable body (21, 31, 41) starts to extend. As a result, a part of the stretchable body (21, 31, 41) is brought into contact with the rotating member (1, 51) so that an alarm is issued caused by the jar. Accordingly, a driver recognizes from this jar that not only the temperature-rise member (16, 55c) but also a friction member of a braking element composed of a disc brake or drum brake or a portion close to the cylinder is heated to the anomalous temperature. If the anomalous temperature rise is detected, fade or vapor-lock can be prevented in advance taking a measure for stopping the vehicle, etc. Since the extended stretchable body (21, 31, 41) functions as a resonant body, it generates a large jar. Since the hydrogen absorbing material 22 absorbs hydrogen when the temperature-rise member (16, 55c) is cooled, the body (21, 31, 41) starts contraction. Accordingly, the anomalous braking element temperature-rise detector 20 can be used repeatedly.

According to the second aspect of the invention, with repetition of the braking operation, the friction member 17 of the (inner) pad 10 is gradually worn out. If the friction member 17 of the pad 10 is worn out and reduced in thickness to the limit of use thereof, a part of the body (21, 31, 41) contacts the rotating disc 1 while it is kept in a contracting state, so that an alarm caused by the jar is issued. Accordingly, the driver can recognize from the jar that the friction member 17 of the pad 10 is worn out and reduced in thickness to the limit of use thereof. As a result, the back plate 16 of the pad 10 directly contacts the rotating disc 1 so as to previously avoid a state where a given braking force is not obtained due to metallic contact. The jar which is generated when the part of the body (21, 31, 41) in a contracting state contacts the rotating disc 1 does not permit the body (21, 31, 41) to properly function as the resonant body, and it is different from the jar which is generated when the part of the body (21, 31, 41) in an extended state contacts the rotating disc 1 in tone and amplitude thereof so that the driver can tell the difference therebetween by hearing.

PREFERRED EMBODIMENT OF THE INVENTION

First Embodiment (FIGS. 1 to 4):

An anomalous braking element temperature-rise detector according to a first embodiment of the present invention will be now described with reference to FIGS. 1 to 4. The anomalous braking element temperature-rise detector is applied to a floating caliper-disc type brake.

In FIGS. 1 to 4, a discoidal disc 1 is fixed to a member which is rotated together with a wheel of a vehicle such as a wheel hub, a flange of an axle shaft, not shown, by way of bolts and nuts, and it is rotated together with the wheel.

Figure 3:
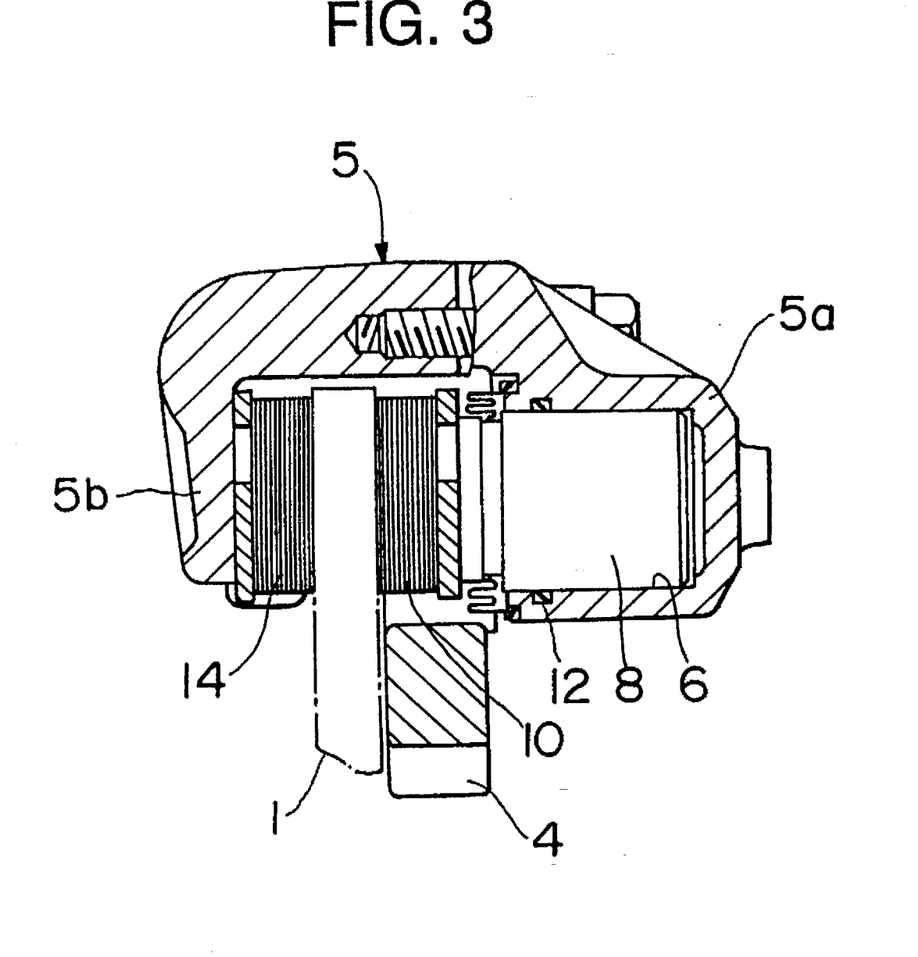
FIG. 3 is a cross-sectional view of a floating caliper-disc type brake according to the first embodiment of the present invention.

As shown in FIG. 3, a support 4 is firmly fixed to a non-rotatable portion of the vehicle such as a knuckle or an axle tube, not shown. A caliper 5 bridging over the disc 1 is slidably supported by the support 4 in a direction of axis of rotation of the disc I (to the left and fight in FIG. 3). A cylinder 6 is provided in a rear arm 5a of the caliper 5 (at one end of the caliper 5 in the direction of axis of rotation of the disc 1).

A piston 8 is slidably engaged in the cylinder 6 in the direction of axis of rotation of the disc 1 by way of a seal ring 12 and an inner pad 10 is brought into contact with the piston 8 so as to be pushed by the piston 8. An outer pad 14 is brought into contact with and supported by a front arm 5b of the caliper 5 (at the other end of the caliper 5 in the direction of axis of rotation of the disc 1). When a brake pedal is depressed, namely, the brake is applied, brake fluid is supplied into the cylinder 6 so that the piston 8 is protruded, namely, pushed out from the cylinder 6 in one direction while elastically deforming the seal ring 12, whereby the disc 1 is clamped by the inner pad 10 and the outer pad 14 so as to generate braking force. When the brake pedal is released, namely, the brake is released, the piston 8 is moved to return owing to elastic deformation of the seal ring 12.

Figure 1:
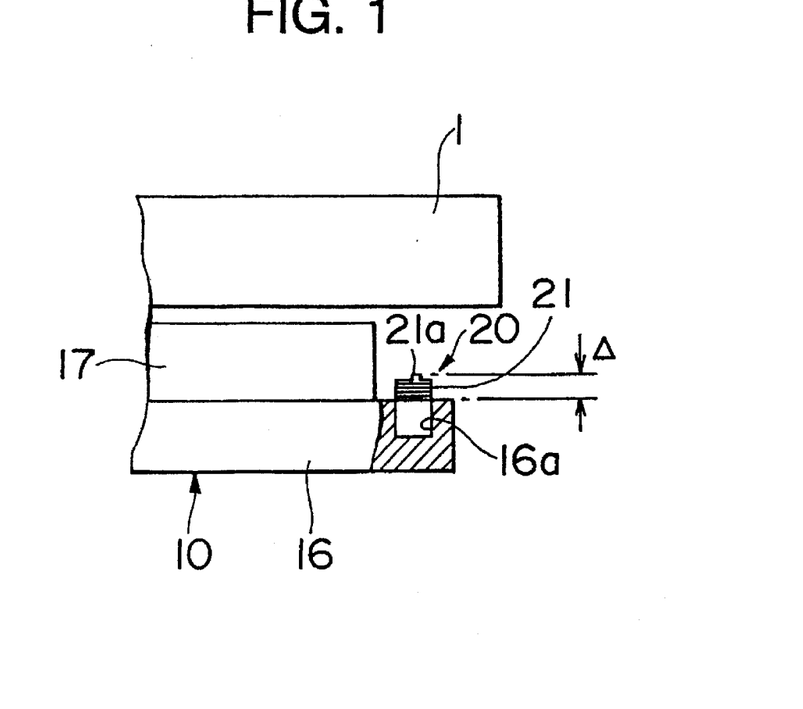
FIG. 1 is a fragmentary view showing a state where an anomalous braking element temperature-rise detector is attached to a temperature-rise member according to a first embodiment of the invention.
Figure 2:
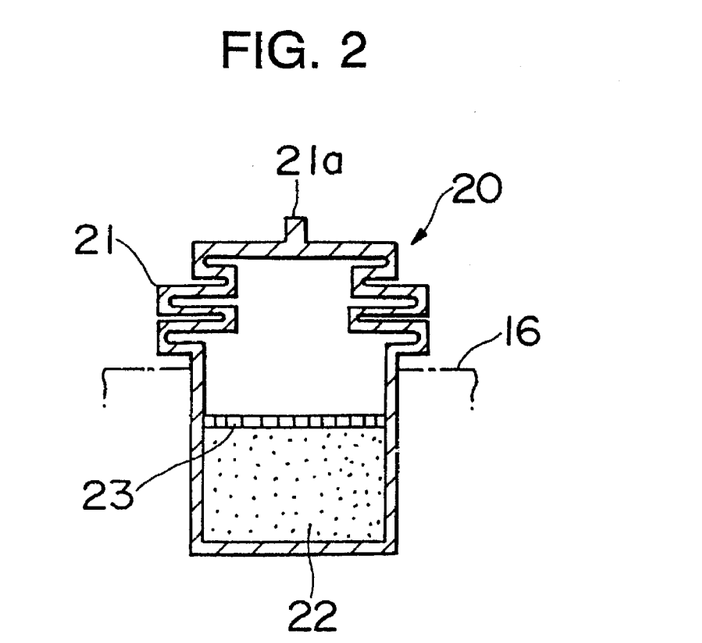
FIG. 2 is a cross-sectional view of the anomalous braking element temperature-rise detector of FIG. 1.

An anomalous braking element temperature-rise detector 20 is fixed to a hole portion 16a of a back plate 16 of the inner pad 10. The hole portion 16a is formed beside a friction member 17 fixed to the back plate 16. The anomalous braking element temperature-rise detector 20 comprises a stretchable body 21 made of a metallic bellows and hydrogen absorbing material 22 which is accommodated in the body 21 as shown in FIG. 2. The hydrogen absorbing material 22 absorbs hydrogen as hydride in an ordinary temperature, and emits the hydrogen in a state where the ordinary temperature is changed to high temperature, i.e., to anomalous braking element temperature, and comprises, e.g. magnesium family, parasium family and titanium family hydrogen absorbing alloys. The hydrogen absorbing material 22 consisting of magnesium family hydrogen absorbing alloys emits hydrogen at the temperature of about 300° C. The hydrogen absorbing material 22 is disposed to confront the back plate 16 which rises in temperature by a braking frictional heat, and it rises satisfactorily in temperature when the back plate 16 rises in temperature. A filter 23 is housed in the body 21 for partitioning the hydrogen absorbing material 22 therein and it has permeability.

When the friction member 17 of the inner pad 10 slidably contacts the disc 1 to thereby generate frictional heat, the back plate 16 is heated to a given temperature, whereby hydrogen is emitted from the hydrogen absorbing material 22 so that the body 21 starts extension. The body 21 is structured contact the disc 1 at a part thereof when it starts to extend More in detail, a metallic projection 21a is formed at a tip of the body 21 wherein it contacts the disc 1. The projection 21a defines a given gap Δ between itself and a surface of the back plate 16 when the body 21 is contracted as shown in FIG. 1, and it contacts the disc 1 in a state where the friction member 17 of the inner pad 10 is worn out by a given amount. The given gap Δ conforms to thickness of the friction member 17 when it is worn out to the limit of its safe use (hereinafter referred to as limit of use).

The operation of the first embodiment will be now described.

When the brake pedal, not shown, is depressed so as to supply the liquid under pressure (brake fluid) to the cylinder 6, the inner pad 10 is pushed out in one direction from the cylinder 6 together with the piston 8 so that the inner pad 10 is pressed against one side surface of the disc 1 which rotates together with the wheel. The caliper 5 is moved to the other direction by its repulsive force so that the outer pad 14 positioned on the front arm 5b is pressed against the other side surface of the disc 1. As a result, not only the disc 1 but also the wheel is braked. Braking force generated in both pads 10 and 14 are transmitted to the support 4.

Figure 4:
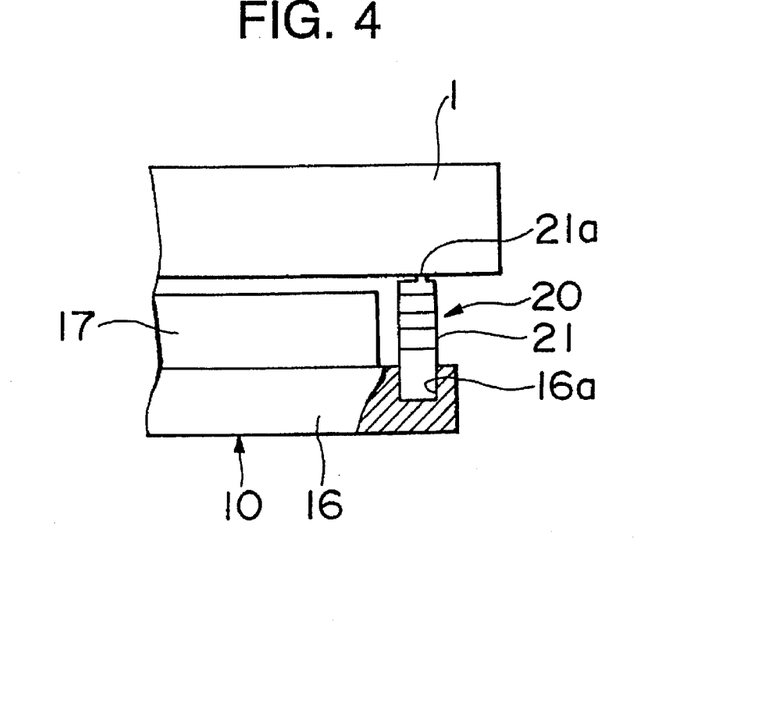
FIG. 4 is a view showing the operation of the anomalous braking element temperature-rise detector of FIG. 1.

With repetition of the braking operation, both pads 10 and 14 rise gradually in temperature. If the friction member 17 of the inner pad 10 to which the anomalous braking element temperature-rise detector 20 is fixed slidably contacts the disc 1 to thereby rise in temperature, whereby the back plate 16 is heated to the given temperature, hydrogen is emitted from the hydrogen absorbing material 22 so that the body 21 starts to extend as shown in FIG. 4. As a result, the projection 21a of the body 21 contacts the rotating disc 1 to thereby generate different noise, i.e. jar, by which an alarm is issued. A driver recognizes from this jar that the friction member 17 of the inner pad 10 is heated to an anomalous braking element temperature or recognizes that not only the inner pad 10 but also a portion close to the cylinder 6 of the caliper 5 are heated to the anomalous braking element temperature. If the anomalous braking element temperature is detected, fade or vapor-lock can be prevented in advance by taking a measure such as stopping the vehicle, etc. Since the extended body 21 functions as a resonant box, it generates a large jar. Since the hydrogen absorbing material 22 absorbs hydrogen when the inner pad 10 is cooled, the body 21 starts contraction. Accordingly, the anomalous braking element temperature-rise detector 20 can be used repeatedly.

With repetition of the braking operation, both pads 10 and 14 are gradually worn out. If the friction member 17 of the inner pad 10 is worn out and reduced in thickness to the limit of use thereof, the projection 21a contacts the rotating disc 1 while the body 21 is kept in a contracting state as shown in FIG. 1, so that an alarm caused by the jar is issued. Accordingly, the driver can recognize from the jar that the friction member 17 of the inner pad 10 is worn out and reduced in thickness to the limit of use thereof. As a result, a dangerous state can be avoided where the back plate 16 of the inner pad 10 directly contacts the rotating disc 1 so that a given braking force is not obtained due to metallic contact. The jar which is generated when the projection 21a of the body 21 in a contracting state contacts the rotating disc 1 does not permit the body 21 to properly function as the resonant box, and it is different from the jar which is generated when the projection 21a of the body 21 in an extended state contacts the rotating disc 1 in tone and amplitude thereof so that the driver can tell the difference between by hearing. The hole portion 16a of the back plate 16 includes a through hole. Further, the body 21 can be fixed to the surface of the back plate 16 without forming the hole portion 16a in the back plate 16.

Figure 5:
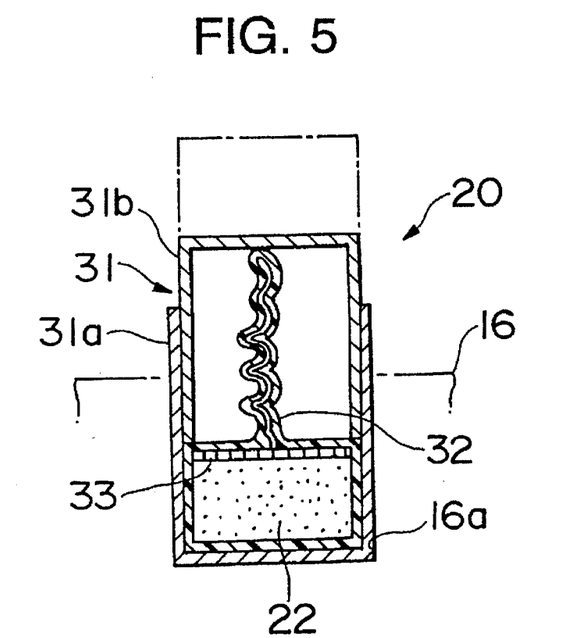
FIG. 5 is a cross-sectional view of an anomalous braking element temperature-rise detector according to a second embodiment of the present invention.

Second Embodiment (FIG. 5):

An anomalous braking element temperature-rise detector 20 according to a second embodiment of the present invention will be now described with reference to FIG. 5.

The anomalous braking element temperature-rise detector 20 comprises a stretchable body 31 composed of an outer cylindrical member 31a having a bottom and an inner cylindrical member 31b having a bottom, wherein they slidably engage with each other, and a flexible container 32 which is made of synthetic resin and housed in the body 31. The hydrogen absorbing material 22 is airtightly accommodated in the container 32 at one end thereof which is brought into close contact with an inner bottom portion of the outer cylindrical member 31a and fixed to the same bottom portion by a means such as an adhesive. The other end of the container 32 is fixed to an inner bottom portion of the inner cylindrical member 31b by a means such as an adhesive. The container 32 is structured in such a manner that an elastic restoration force is given to the container 32 in a folded contracting state as shown in FIG. 5, and the inner cylindrical member 31b is slidably engaged in the outer cylindrical member 31a when the container 32 is contracted so that the contracting state of the body 31 can be maintained. Since the other end of the container 32 is fixed to the inner bottom portion of the inner cylindrical member 31b, expansion force of the container 32 surely acts upon the inner cylindrical member 31b so that the inner cylindrical member 31b can be protruded from the outer cylindrical member 31a with assurance. Denoted at 33 is a filter for partitioning the hydrogen absorbing material 22 in the body 31 and has good permeability. In this anomalous braking element temperature-rise detector 20, the outer cylindrical member 31a is fixed to the hole portion 16a of the back plate 16 of the inner pad 10 like the first embodiment so that the hydrogen absorbing material 22 in the outer cylindrical member 31a is permitted to confront the back plate 16.

With such an arrangement of the second embodiment, when the back plate 16 is heated to a given temperature with repetition of the braking operation, hydrogen is emitted from the hydrogen absorbing material 22 so that the container 32 is extended while it is expanded. As a result, the inner cylindrical member 31b is pushed out from the outer cylindrical member 31a so that the body 31 starts extension as shown in broken line in FIG. 5. Consequently, an outer bottom portion of the inner cylindrical member 31b contacts the rotating disc 1 so as to issue the alarm owing to the jar, whereby fade and vapor-lock can be prevented in advance like the first embodiment. When the inner pad 10 is cooled, the container 32 is elastically restored to the folded state so that the inner cylindrical member 31b is slidably engaged in the outer cylindrical member 31a, whereby the body 31 starts contraction.

Further, if the friction member 17 of the inner pad 10 is worn out and reduced in thickness to the limit of use thereof, the outer bottom portion of the inner cylindrical member 31b contacts the rotating disc 1 in a state where the body 31 is in the contracting state so as to issue the alarm owing to the jar. As a result, the driver can recognize that the friction member 17 of the inner pad 10 is worn out and reduced in thickness to the limit of use thereof. The outer cylindrical member 31a and the inner cylindrical member 31b can be replaced by a coil spring so that the coil spring is elastically extended when the container 32 is expanded, whereby a part of the coil spring is permitted to contact the disc 1 to thereby generate jar. In this case, since the container 32 can be contracted owing to the elastic restoration force of the coil spring, it is not necessary to provide the container 32 with the above-mentioned elastic deformation characteristics.

Figure 6:
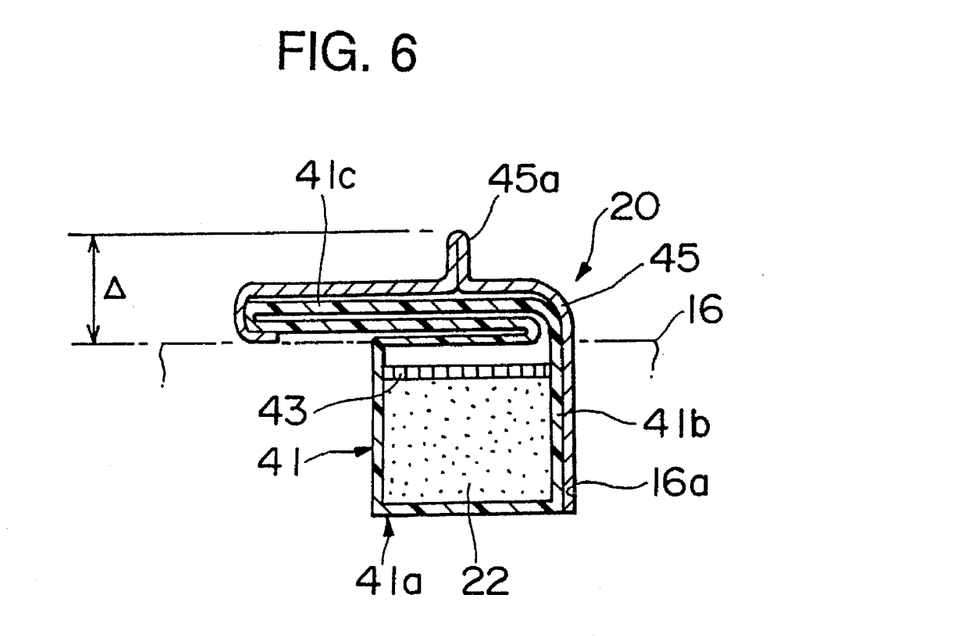
FIG. 6 is a cross-sectional view of an anomalous braking element temperature-rise detector according to a third embodiment of the present invention.

Third Embodiment (FIG. 6):

An anomalous braking element temperature-rise detector according to a third embodiment of the present invention will be now described with reference to FIG. 6.

A stretchable body 41 comprises an airtightly formed container 41a made of flexible synthetic resin and a presser member 45 made of spring steels. The container 41a comprises a cylindrical portion 41b having a bottom portion and capable of containing the hydrogen absorbing material 22 therein, and a stretchable portion 41c which is connected to the cylindrical portion 41b and foldable substantially perpendicularly relative to the cylindrical portion 41b and extendible along one surface of the cylindrical portion 41b. Denoted at 43 is a filter for partitioning the hydrogen absorbing material 22 in the body 41 and having permeability. One end portion of the presser member 45 is fixed to the hole portion 16a of the back plate 16 together with the cylindrical portion 41b, and the other end of the presser member 45 elastically holds the stretchable portion 41c in a folded state and restricts the random motion of the stretchable portion 41c. Whereupon, the anomalous braking element temperature-rise detector 20 is fixed to the hole portion 16a of the inner pad 10 in the same manner as the first embodiment, and the hydrogen absorbing material 22 in the cylindrical portion 41b confronts the back plate 16. Denoted at 45a is a projection formed in the presser member 45, and this projection 45a defines a given gap Δ between it and the surface of the back plate 16 in a contracting state where the body 41 is folded and contacts the disc 1 in a state where the friction member 17 of the inner pad 10 is worn out by a given amount.

With such an arrangement of the third embodiment, hydrogen is emitted from the hydrogen absorbing material 22 when the back plate 16 is heated to a given temperature so that the body 41 starts to extend. That is, the stretchable portion 41c rises gradually and the presser member 45 is elastically deformed accompanied by the rise of the stretchable portion 41c. Consequently, a tip portion (left end portion in FIG. 6) of the stretchable portion 41c of the body 41 contacts the rotating disc 1 so as to issue the alarm owing to the jar, fade or vapor-lock can be prevented in advance like the first embodiment. If the inner pad 10 is cooled so that the hydrogen absorbing material 22 absorbs hydrogen, the stretchable portion 41c of the body 41 is tilted to start contraction, whereby the presser member 45 is elastically restored. Accordingly, the anomalous braking element temperature-rise detector 20 can be repeatedly used.

With repetition of the braking operation, if the friction member 17 of the inner pad 10 is worn out and reduced in thickness to the limit of use thereof, the projection 45a of the presser member 45 contacts the rotating disc 1 while the body 41 is kept in contracting state, so that the alarm is issued owing to the jar. Accordingly, the driver can recognize from the jar that the friction member 17 of the inner pad 10 is worn out and reduced in thickness to the limit of use thereof.

Figure 7:
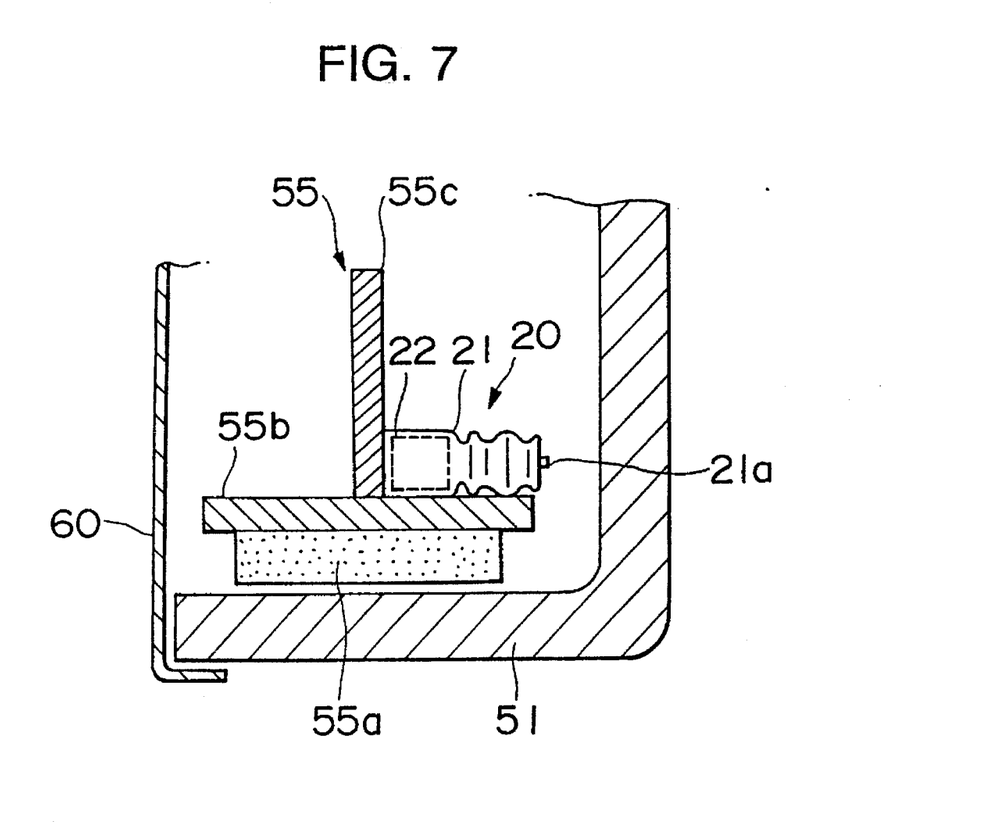
FIG. 7 is a view showing a fourth embodiment where the braking element anomalous temperature-rise detector of FIG. 2 is attached to a temperature-rise member of the drum brake.

Fourth embodiment (FIG. 7):

FIG. 7 is a view showing a fourth embodiment where the anomalous braking element temperature-rise detector 20 according to the first embodiment is applied to a drum brake wherein elements which perform substantially the same function as the first embodiment are denoted at the same numerals. A drum 51 is fixed to a member which rotates together with a wheel of a vehicle, not shown, by bolts and nuts, and it is rotated together with the wheel.

On the other hand, a backing plate 60 is firmly fixed to a non-rotatable portion, not shown, of the vehicle. A pair of brake shoes 55 are disposed on the backing plate 60 so as to confront each other, and they are supported by a shoe hold down, not shown. Whereupon, the pair of brake shoes 55 are largely opened by a or plural wheel cylinders, not shown, and a friction member 55a fixed to a rim 55b of each brake shoe 55 slidably contacts an inner peripheral surface of the drum 51 to thereby generate a braking force. When the brake is released, the pair of brake shoes 55 start contraction in their diameters owing to the operation of a shoe return spring, not shown.

Then, the anomalous braking element temperature-rise detector 20 is fixed to the surface of a web 55c of the brake shoe 55. The anomalous braking element temperature-rise detector 20 has the same structure as shown in FIG. 2 and comprises the body 21 made of the metallic bellows and the hydrogen absorbing material 22 accommodated in the body 21, wherein the hydrogen absorbing material 22 is disposed to confront the web 55c of the brake shoe 55. The web 55c serves as a temperature-rise member which rises in temperature owing to a braking frictional heat. Whereupon, when the friction member 55a of the brake shoe 55 slidably contacts the drum 51 to rise in temperature so that the web 55c is heated to a given temperature, hydrogen is emitted from the hydrogen absorbing material 22 so that the body 21 starts to extend. As a result, the body 21 can contact the inner side wall of the drum 51 at a part thereof(the projection 21a).

The operation of the fourth embodiment will be now described.

If the pair of brake shoes 55 are largely opened when the brake pedal, not shown, is depressed, the friction member 55a is pressed against the inner peripheral surface of the drum 51 which is rotated together with the wheel, so that not only the drum 51 but also the wheel is braked.

With repetition of such braking operation, the brake shoe 55 rises gradually in temperature. When the friction member 55a of the brake shoe 55 to which the anomalous braking element temperature-rise detector 20 is fixed slidably contacts the drum 51 to rise in temperature so that the web 55c is heated to a given temperature, hydrogen is emitted from the hydrogen absorbing material 22 so that the body 21 starts extension. As a result, the projection 21a of the body 21 contacts the rotating disc 1, so as to issue the alarm owing to the jar. Accordingly, the driver recognizes that the friction member 55a of the brake shoe 55 is heated to an anomalous braking element temperature or recognizes that not only the brake shoe 55 but also a portion close to the wheel cylinder is heated to the anomalous braking element temperature. If the anomalous braking element temperature rise is detected, fade or vapor-lock can be prevented in advance by taking a measure such as stopping the vehicle, etc. Since the extended body 21 functions as the resonant box, it generates a large jar. Since the hydrogen absorbing material 22 absorbs hydrogen when the brake shoe 55 is cooled, the body 21 starts to contract when cooled. Accordingly, the anomalous braking element temperature-rise detector 20 can be repeatedly used. However, in the anomalous braking element temperature-rise detector 20 in the fourth embodiment, the alarm owing to the jar is not issued automatically when the friction member 55a of the brake shoe 55 is worn out and reduced in thickness to the limit of use thereof.

The anomalous braking element temperature-rise detector 20 is fixed to the back plate 16 of the inner pad 10 of the disc brake in the first to third embodiment, while it is fixed to the web 55c of the brake shoe 55 of the drum brake in the fourth embodiment. With the first to fourth embodiments, the temperature rise of the friction member 17 and friction member 55a can be determined relatively accurately so as to prevent fade. However, the anomalous braking element temperature-rise detector 20 can be provided on other appropriate portions of the braking element comprising the disc brake or the drum brake. Particularly, if the anomalous braking element temperature-rise detector 20 is fixed to a portion close to the cylinder 6 of the caliper 5 or an outer wall of the wheel cylinder of the drum brake, anomalous braking element temperature rise of the brake fluid in the cylinder 6 of the disc brake or in the wheel cylinder of the drum brake can be determined relatively accurately so as to accurately detect the likelihood of the occurrence of vapor-lock. As regards the material of the hydrogen absorbing material 22, it must be selected from material having appropriate temperature characteristics depending on the object of the hydrogen absorbing material 22, namely, depending on the object to prevent either fade or vapor-lock. Accordingly, it is necessary to measure in advance the temperature of a portion where the anomalous braking element temperature-rise detector 20 is fixed, then appropriately select the hydrogen absorbing material 22 having the property to emit hydrogen at the same temperature.

Figure 8:
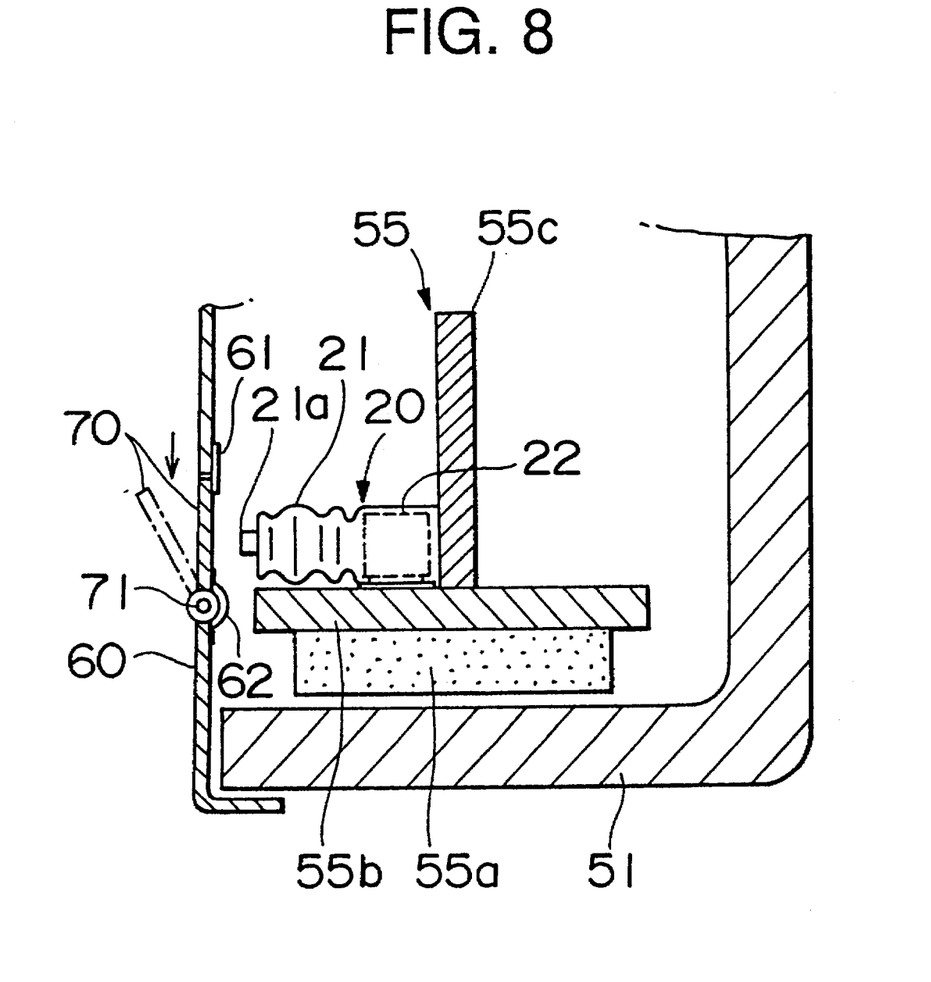
FIG. 8 is view showing an example where a closing cover of a backing plate of a drum brake is opened by the anomalous braking element temperature-rise detector of FIG. 7.

FIG. 8 is view showing an example where a closing cover 70 of the backing plate 60 of a drum brake is opened by the anomalous braking element temperature-rise detector 20, wherein elements having substantially the same function as the fourth embodiment are denoted at the same numerals. In this example, the anomalous braking element temperature-rise detector 20 is fixed to a surface of the web 55c of the brake shoe 55 confronting the backing plate 60, and the hydrogen absorbing material 22 is disposed to confront the web 55c of the brake shoe 55 serving as a temperature-rise member which rises in temperature owing to the braking frictional heat. On the other hand, the closing cover 70 is attached to one edge portion of an opening of the backing plate 60 by way of a hinge pin 71 so as to open or close the opening of the backing plate 60, and it is urged by a spring 62 in the direction to close the opening of the backing plate 60. In a state where the closing cover 70 is closed, the closing cover 70 is brought into contact with and restricted by a stopper 61 which is fixed to the other edge portion of the opening of the backing plate 60. The anomalous braking element temperature-rise detector 20 comprises the body 21, the hydrogen absorbing material 22 accommodated in the body 21 which absorbs hydrogen at an ordinary temperature and emits hydrogen when the ordinary temperature is changed to the anomalous braking element temperature. The anomalous braking element temperature-rise detector 20 is fixed to the web 55c which rises in temperature owing to the braking frictional heat of the braking element. The hydrogen absorbing material 22 in the body 21 is disposed to confront the web 55c, and the projection 21a of the body 21 is brought into contact with the inner surface of the closing cover 70 in a state where the body 21 is extended by hydrogen emitted from the hydrogen absorbing material 22.

With the arrangement of the anomalous braking element temperature-rise detector 20 according to this example, the friction member 55a of the brake shoe 55 slidably contacts the drum 51 to thereby rise in temperature. If the web 55c rises to a given temperature, hydrogen is emitted from the hydrogen absorbing material 22 so that the body 21 starts to extend. The body 21 is then brought into contact with the inner surface of the closing cover 70 at a part thereof (projection 21a) to thereby open the closing cover 70 against resiliency of the spring 62. Meanwhile, if the front portion of the vehicle is opened in the traveling direction by the closing cover 70, fresh air is introduced in the drum 51, thereby cooling the inner surface of the drum 51, the brake shoe 55, etc. As a result, fade or vapor-lock can be prevented in advance. If the web 55c is cooled, the hydrogen absorbing material 22 absorbs hydrogen so that the body 21 starts contraction and the closing cover 70 which is urged by the spring 60 is closed. Accordingly, the anomalous braking element temperature-rise detector 20 can be used repeatedly. Whereupon, the anomalous braking element temperature-rise detector 20 capable of opening and closing the closing cover 70 can be mounted on a disc brake. If the anomalous braking element temperature-rise detector 20 is mounted on the disc brake, the closing cover 70 is provided on a baffle plate covering the disc brake.

As evident from the aforementioned explanation, according to the anomalous braking element temperature-rise detector of the first aspect of the invention, since it can detect the temperature rise of the braking element to the anomalous braking element temperature, it is possible to prevent in advance the braking force from being lowered because of the occurrence of fade and also prevent the offensive odor from being generated because of the thermal decomposition of the organic matter, whereby safety and commodity merit of the braking element can be remarkably enhanced. Further, the braking inactive state caused by vapor-lock can be prevented in advance, thereby improving the reliability and safety of the brake.

According to the second aspect of the invention, since the alarm is issued even in case the friction member of the pad of the disc brake is worn out and reduced in thickness to the limit of use thereof, it is possible to prevent in advance the braking inactive state caused by the wearing of the friction member, thereby further enhancing the reliability and safety of the brake.

What is claimed is:

1. An anomalous braking element braking element temperature-rise detector assembly comprising:

a rotatable member;

a temperature-rise member which is a part of a group of braking elements which act on said rotatable member so as to provide a braking force thereagainst, said temperature-rise member rising in temperature when the braking force is applied to said rotatable member;

a hydrogen absorbing material for absorbing hydrogen at an ordinary temperature and discharging hydrogen when said temperature-rise member rises to an anomalous temperature; and a stretchable body for accommodating therein said hydrogen absorbing material, said stretchable body being in contact with said temperature-rise member such that heat transfer occurs between said temperature-rise member and said hydrogen absorbing material;

wherein a part of said stretchable body slidably contacts said rotatable member, which rotates relative to said stretchable body, when said stretchable body is extended by hydrogen discharged from said hydrogen absorbing material.

2. The anomalous braking element braking element temperature-rise detector assembly according to claim 1, wherein said temperature-rise member is a back plate of a pad of a disc brake, said rotatable member is a disc, and a part of said stretchable body slidably contacts said disc when a friction member of said pad is worn out by a given amount.

3. The anomalous braking element braking element temperature-rise detector assembly according to claim 1, wherein said stretchable body includes a metallic bellows.

4. The anomalous braking element braking element temperature-rise detector assembly according to claim 1, wherein said stretchable body comprises:

an airtightly formed container made of flexible synthetic resin and accommodating therein said hydrogen absorbing material; and a presser member made of spring steel for elastically biasing said airtightly formed container so as to contract said airtightly formed container;

said airtightly formed container and said presser member being fixed to said temperature-rise member.

5. The anomalous braking element braking element temperature-rise detector assembly according to claim 1, wherein a permeable filter is housed in said stretchable body for partitioning said hydrogen absorbing material.

6. The anomalous braking element braking element temperature-rise detector assembly according to claim 1, wherein said temperature-rise member is a web of a brake shoe, said rotatable member is a drum, and a part of said stretchable body slidably contacts said drum when said stretchable body expands by a given amount.

7. An anomalous braking element braking element temperature-rise detector assembly comprising:

a rotatable member;

a temperature-rise member which is a part of a group of braking elements which act on said rotatable member so as to provide a braking force thereagainst, said temperature-rise member rising in temperature when the braking force is applied to said rotatable member;

hydrogen absorbing material for absorbing hydrogen at an ordinary temperature and discharging hydrogen when said temperature-rise member rises to an anomalous braking element temperature;

a stretchable body for accommodating therein said hydrogen absorbing material, said stretchable body being in contact with said temperature-rise member such that heat transfer occurs between said temperature-rise member and said hydrogen absorbing material; and a backing plate positioned adjacent said rotatable member, said backing plate including an opening provided therein and a cover part, said cover part normally covering said opening, wherein a part of said stretchable body contacts said cover part to effect an uncovering of said opening when said stretchable body is extended by hydrogen discharged from said hydrogen absorbing material.

* * * * *

UNITED STATES PATENT AND TRADEMARK OFFICE
CERTIFICATE OF CORRECTION

PATENT NO. : 5,641,042
DATED : June 24, 1997
INVENTOR(S) : Hiroyuki MAEDA

It is certified that error appears in the above-indentified patent and that said Letters Patent is hereby corrected as shown below:

Column 9, line 52; change "An anomalous braking element braking element" to
---An anomalous braking element---.

Column 10, line 8; change "The anomalous braking element braking element" to
---The anomalous braking element---.

Column 10, line 15; change "The anomalous braking element braking element" to
---The anomalous braking element---.

Column 10, line 18; change "The anomalous braking element braking element" to
---The anomalous braking element---.

UNITED STATES PATENT AND TRADEMARK OFFICE
CERTIFICATE OF CORRECTION

PATENT NO. : 5,641,042
DATED : June 24, 1997
INVENTOR(S) : Hiroyuki MAEDA

It is certified that error appears in the above-indentified patent and that said Letters Patent is hereby corrected as shown below:

Column 10, line 29; change "The anomalous braking element braking element" to
---The anomalous braking element---.

Column 10, line 33; change "The anomalous braking element braking element" to
---The anomalous braking element---.

Column 10, line 40; change "An anomalous braking element braking element" to
---An anomalous braking element---.

Column 10, line 51; change "braking element temperature;" to
---temperature;---.

Signed and Sealed this

Twenty-eighth Day of October, 1997

Attest:

BRUCE LEHMAN

Attesting Officer

Commissioner of Patents and Trademarks